United States Patent [19]
Durrant et al.

[11] 3,754,956

[45] Aug. 28, 1973

[54] TREATMENT OF OXIDE PIGMENTS

[75] Inventors: George Geoffrey Durrant; Michael Hugh Gamon; Nigel John House, all of Grimsby, England

[73] Assignee: Laporte Industries Limited, London, England

[22] Filed: Mar. 2, 1971

[21] Appl. No.: 120,373

[30] Foreign Application Priority Data
Mar. 13, 1970 Great Britain.................. 12,300/70

[52] U.S. Cl............................. 106/300, 106/308 Q
[51] Int. Cl............................................... C09c 1/36
[58] Field of Search............... 106/300, 308 Q, 309; 260/340.2, 343

[56] References Cited
UNITED STATES PATENTS

| 3,453,130 | 7/1969 | Feld................................... | 106/300 |
| 2,914,556 | 11/1959 | Hostettler et al.................. | 260/343 |
| 2,311,534 | 2/1943 | Gleason............................. | 260/343 |

*Primary Examiner*—James E. Poer
*Attorney*—Holcombe, Wetherill & Brisebois

[57] ABSTRACT

The wetting and dispersion characteristics of titania pigments in plastic materials is improved by treating the pigment with from 0.1-60.0 percent by weight of a polylactone having terminal hydroxy groups, the polylactone being in liquid form or in solution.

15 Claims, No Drawings

TREATMENT OF OXIDE PIGMENTS

This invention relates to the treatment of titanium dioxide pigments.

It is well established that certain properties of titanium dioxide pigments can be improved by subjecting the pigments to surface treatment with one or more inorganic and/or organic substances.

Thus, for example, the durability of titanium dioxide pigments in use can be improved by coating the pigmentary particles with one or more inorganic substances. The substances most commonly used for this purpose are hydroxides, hydrous oxides, and basic sulphates. However, the wetting and dispersion characteristics of such inorganically-treated pigments in plastics materials are not wholly satisfactory. It has previously been proposed to improve these properties by contacting the inorganically-treated pigments with a silicone or with a film-forming thermoplastic material. Whilst each of these treatments is reasonably effective in improving the wetting and dispersibility, both are relatively costly and, moreover, the silicone treatment causes the finished pigment obtained after drying and milling to be extremely dusty and therefore inconvenient to handle.

Although organic surface treatments are commonly carried out subsequent to or in combination with inorganic treatment, there are some applications for which an organic treatment alone may be sufficient. Thus, for example, British Pat. Specification No. 1,158,146 describes a process for improving the water dispersibility of a titanium dioxide pigment and/or its dispersibility in a paint, lacquer, or plastics medium, in which process the pigment is contacted with a compound of the cycloalkane series having a hydroxyl group directly attached to the ring and at least two hydroxyalkyl groups.

The present invention provides a process for the surface treatment of pigmentary titanium dioxide, wherein the pigment is treated with from 0.1 to 60.0 percent by weight (based on the weight of the pigment to be treated) of a polylactone that has terminal hydroxyl groups, the polyactone being in liquid form or in solution.

Preferably, the quantity of the polyactone is not greater than 25.0 percent by weight (based on the weight of the pigment to be treated).

Titanium dioxide pigment that has been treated in accordance with the invention shows good wetting and dispersion properties when being incorporated in plastics materials, and is considerably less dusty than silicone-treated pigments. A further advantage of the process of the invention is that the treated pigment shows improved hiding power and gloss when incorporated into paint systems. Moreover, the polylactones are less expensive to produce than many of the previously proposed organic surface-treating agents.

Advantageously, the titanium dioxide pigment is subjected to an inorganic surface treatment, which preferably comprises coating the pigment with one or more hydrous oxides, hydroxides, phosphates and/or basic sulphates, before being treated with the polylactone.

Preferred phosphates are those of titanium aluminium, and zirconium.

The or each hydroxide, hydrated oxide or basic sulphate applied to the pigment prior to the polylactone treatment is advantageously a compound of beryllium, calcium, magnesium, barium, boron, aluminium, silicon, tin, lead, antimony, titanium, zirconium, hafnium, niobium, tantalum, zinc or cerium.

The coating may be applied to the pigmentary particles in any suitable manner. Normally, the coating is applied by adding the appropriate surface-treating agent or agents to an aqueous slurry of the pigment. Thus, for example, the coating may be deposited on the pigment by contacting the pigment with an alkaline agent and with an acid-reacting compound of the desired element. Alternatively, the coating may be formed by treating the pigment with an acid-reacting compound of a selected element and with a basic compound of the same element or of another selected element. Thus, for example, the coating may be the result of treating the pigment with titanium tetrachloride and sodium aluminate.

As an alternative to forming the coating by an acid-base reaction, it may be formed by hydrolysis of a compound of the desired element, for example, by the hydrolysis of titanium tetrachloride.

Advantageously, the coating is formed by precipitating quantities of at least two hydroxides or hydrated oxides of one or more of aluminium, silicon, boron, titanium, antimony, zinc, magnesium, tin, lead, cerium and zirconium into intimate association with the pigment.

The coating may consist of one layer formed by co-precipitation of two or more hydroxides, hydrated oxides, phosphates and/or basic sulphates, or of a plurality of discrete layers, each such discrete layer having been deposited separately. Where the coating consists of a plurality of discrete layers, each layer may consist of a single hydroxide, hydrous oxide, phosphate, or basic sulphate, or some or all of the layers may consist of more than one such compound.

The temperature at which any inorganic surface treatment is carried out may be selected in known manner in accordance with the particular surface treatment it is desired to carry out. Thus, for example, if it is desired to co-precipitate quantities of two or more hydroxides or hydrous oxides of one or more of aluminium, silicon, boron, titanium, antimony, zinc, magnesium, tin, lead, cerium, and zirconium, the process is advantageously carried out at a temperature in the range of from 60° to 80° C.

With regard to the total weight of the inorganic coating that may be formed on the pigment, the limits are not critical; but, as is well-known in the art of surface-treating titanium dioxide pigments, a suitable total weight will normally lie in the range of from about 0.5 to about 25 percent by weight, based on the weight of the uncoated pigment.

The pigment may be treated with the polylactone in a variety of ways. Thus, for example, a solution of the polylactone in a suitable solvent, for example, chloroform or ethyl acetate, may be incorporated with a quantity of dry pigment, the solvent then being allowed or caused to evaporate, leaving a surface coating of the polylactone on the pigment. Advantageously, the treatment is effected by incorporating the polylactone (which may be in the form of a solution) with an aqueous slurry of the pigment.

Alternatively, an emulsion of a liquid polylactone in water may be incorporated with the pigment. Preferably, the pigment is in the form of an aqueous slurry.

If desired, the polylactone may be incorporated with the pigment without first being dissolved, diluted or dispersed, provided that the temperature is such that the polylactone is in liquid form. Many polylactones are waxy solids at room temperature but melt at moderately elevated temperatures, for example, at about 60° C. A polylactone of this kind may be rendered liquid by heating and then incorporated in liquid form with an aqueous slurry of the pigment. Advantageously, however, the waxy solid itself is added to the slurry, and the temperature of the slurry is such that the polylactone melts on contact therewith.

Although it is possible to add successive quantities of the pigment to the desired quantity of the polylactone, it is advantageous to carry out the process the other way round, that is to say, to add the polylactone to the pigment, which is preferably in the form of an aqueous slurry.

It is not essential for the polylactone to be in liquid form for the whole of the treatment process. Thus, for example, it is possible for a solid polylactone to be incorporated as such with the pigment, the temperature then being raised until the polylactone becomes liquid.

After treatment with the polylactone, drying and milling of the treated pigment yields a product which is especially suitable for use in plastics or paint systems. Accordingly, the invention also provides a plastics or paint material which incorporates titanium dioxide pigment that has been treated in accordance with the invention. The treated pigment may be milled by micronising, tht is to say, fluid energy milling. It will usually be preferable to employ air as the fluid medium, as there may be some circumstances in which steam micronising will cause hydrolysis of the polylactone deposited on the pigment.

Advantageously, the polylactone is a polylactone of the general formula I,

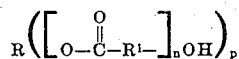  I in which formula R represents an aliphatic hydrocarbon group which may be saturated or unsaturated, substituted or unsubstituted, and which may be substituted in the carbon chain by one or more hetero atoms (preferably oxygen atoms), $R^1$ represents an aliphatic hydrocarbon group having a straight chain of from 4 to 12 carbon atoms and which may be unsubstituted or may be substituted with one or more lower alkyl (preferably methyl) groups, $n$ represents a whole number of from 2 to 300, and $p$ represents a whole number from 2 to 8.

The polylactone used in accordance with the present invention may be prepared by polymerising a lactone of the general formula II

  II in which the group represented by $R^1$ is as hereinbefore defined, in the presence of a polyol of the general formula III,

  III which R and $p$ are as hereinbefore defined, and in the presence of a suitable catalyst.

The polyol acts as initiator and, as can be seen from the above general formulae, each molecule of the polylactone ultimately obtained contains one molecule of the initiator. Consequently, by varying the relative proportions in the reaction mixture of the lactone monomer and the polyol, it is possible to exercise control over the molecular weight of the polylactone produced. Thus, increasing the proportion of the polyol decreases the molecular weight the product polylactone.

Examples of polyols which may be used in the preparation of the polylactones include ethylene-, propylene-, and hexylene-glycols, trimethylol propane, glycerol, pentaerythritol, mannitol and sorbitol. A polymeric compound such as, for example, a polyethylene glycol, may be used. If desired, the polyol may itself be a polylactone diol.

Examples of polylactones which may be used in the process of the invention are those derived from valerolactone, caprolactone, 3,3,5-trimethyl-caprolactone, heptanolactone, and dedecanolactone.

Either a single polylactone or a mixture of two or more polylactones may be used. Where a mixture is used, the components of the mixture may be incorporated with the inorganically-coated pigment either separately or together.

Advantageously, the polylactone is a polylactone derived from ethylene glycol and caprolactone.

Among the several catalysts which are known to be effective in the polymerisation of lactones there may be mentioned certain organometallic compounds, for example, dibutyl zinc or butyl lithium, and trichloroacetic acid.

The treatment of the pigment with the polylactone may be carried out under conditions or normal laboratory agitation, as may any inorganic surface treatment process carried out prior to or in combination with the polylactone treatment. Advantageously, the pigment is subjected to intensive agitation, for example, in a sand mill or colloid mill, or under the action of an ultra-sonic vibrator, during and/or after the formation of any inorganic coating. If desired, such intensive agitation may be carried out during the polylactone treatment.

The following Examples illustrate the invention:

EXAMPLE 1

A rutile titanium dioxide pigment was coated with 0.6 percent by weight of hydrous silica (calculated as $SiO_2$), and with 1.0 percent by weight of hydrous alumina (calculated as $Al_2O_3$), each percentage being based on the weight of titanium dioxide. The coating was carried out by incorporating aluminium sulphate and sodium silicate with an aqueous slurry of the pigment, and then neutralising with caustic soda solution. The coated pigment was washed, dried, and ground, and the resulting dry material was divided into three parts.

The first part (A) was used to provide a basis for comparison and was not subjected to any further treatment.

300 gms. of the second part was added to a solution of 1.5 gms. of polycaprolactone diol (molecular weight 9000) in 400 ml. chloroform. After 30 minutes, the chloroform was removed by evaporation, and the solid product so obtained was dried and milled, yielding a pigment B.

In order to provide a further basis for comparison, 300 gms. of the third part was made up into a slurry in 1000 ml. water, and 1.8 gms. of polydimethylsiloxane was added to the resulting aqueous slurry. During the addition of the polydimethylsiloxane, the aqueous slurry was stirred to assist in contacting the pigment with the siloxane. The slurry was then filtered, and the resulting filter cake was dried and milled, yielding a pigment C.

The wetting and dispersion properties of each of the pigments A, B, and C, were then ascertained by means of the Brabender plastograph test. In the Brabender test, the pigment and the plastics material to be pigmented are mixed together in a chamber, and the torque necessary to maintain constant the speed of revolution of a rotary mixing member is recorded continuously as a function of time. In general, the graph of torque against time first rises to a maximum and then falls away asymptotically towards zero. The important features of the graph are the maximum torque (which occurs as the pigment is wetted out), the time taken to reach the maximum value (peak time), the time taken to return approximately to zero (final time), and the area under the graph, which represents the amount of work done. The values obtained for the three pigments A, B, and C are shown in the following Table. It is desirable for all the values to be as low as possible, a change of as little as ½ minute in the peak time being a significant difference.

| minutes | Peak time | Maximum torque | Area | Final time minutes |
| --- | --- | --- | --- | --- |
| A | 31¾ | 795 mg. | 1761 | 46 |
| B | 25¼ | 385 mg. | 511 | 40 |
| C | 25½ | 390 mg. | 420 | 35 |

Although the wetting and dispersion properties of pigment B are not superior to pigment C, it is to be noted that pigment C (which had not been obtained in accordance with the invention), was extremely dusty in comparison to pigment B, which did not form dust.

EXAMPLE 2

An aqueous slurry of rutile titanium dioxide pigment was treated with aluminium sulphate and sodium silicate, and was then neutralised with caustic soda solution. The quantities of aluminium sulphate and sodium silicate, and was then neutralised with caustic soda solution. The quantities of aluminium sulphated and sodium silicate were sufficient to coat the pigment with 1.0 percent hydrous alumina (calculated as $Al_2O_3$) and 0.6 percent hydrous silica (calculated as $SiO_2$), each percentage being by weight and based on the weight of $TiO_2$. An aqueous slurry of 2Kg. of the coated pigment at a concentration of 300 grams/litre was divided into three equal parts. Different quantities of a polycaprolactone diol (molecular weight 1200) were added to each of the parts, while stirring the slurries and maintaining their temperatures at 60° C., at which temperature the polylactone diol used was a liquid. The pigments obtained by filtration, drying, and milling were tested on the Brabender plastograph as described in Example 1 and the results of the tests are set out in the Table below, which also shows the quantity of the polylactone incorporated with each pigment.

| Sample | Treatment | Peak Time | Peak Torque | Area | Final Time |
| --- | --- | --- | --- | --- | --- |
| 1 | 0.5% | 28 mins. | 465 mg. | 877 | 41 mins. |
| 2 | 1.0% | 26¼ mins. | 435 mg. | 700 | 42 mins. |
| 3 | 2.0% | 25¾ mins. | 410 mg. | 615 | 39 mins. |

In order to provide a basis for comparison, the process of the Example was repeated using 0.6 percent by weight of polydimethyl siloxane instead of the polycaprolactone diol. Although the resulting silicone-treated pigment gave similar results in the Brabender test, it was considerably more dusty and inconvenient to handle than the pigments that had been subjected to polylactone treatment in accordance with the invention.

EXAMPLE 3

The process of Example 2 was repeated, except that the polylactone was a polycaprolactone of molecular weight 2000. The results of the Brabender Plastograph Test are set out in the table below, which also shows the quantity of the polylactone used in each case.

| Sample | Treatment | Peak Time | Peak Torque | Area | Final Time |
| --- | --- | --- | --- | --- | --- |
| 1 | 0.5% | 28.0 mins. | 475 mg. | 800 | 40½ mins. |
| 2 | 1.0% | 25.0 mins. | 390 mg. | 584 | 40 mins. |
| 3 | 2.0% | 25 ½ mins. | 400 mg. | 609 | 40½ mins. |

In order to provide a basis for comparison, the process of the Example was repeated using 0.6 percent by weight of polydimethyl siloxane instead of the polycaprolactone diol. Although the resulting silicone-treated pigment gave similar results in the Brabender test, it was considerably more dusty and inconvenient to handle than the pigments that had been subjected to polylactone treatment in accordance with the invention.

EXAMPLE 4

A rutile titanium dioxide pigment was coated with hydrous alumina and hydrous silica as described in Example 1. After drying, 500 gms. of the coated pigment was added to each of two solutions of 5 gms. of a polycaprolactone in 1 l. chloroform, the molecular weights of the two polycaprolactones being 1200 and 2000, respectively. The chloroform was then removed by evaporation, and the two pigments so obtained were dried, milled, and tested in the Brabender plastograph. The results of the test are set out below.

| Mol. Wt. of polylactone | Peak Time | Peak Torque | Area | Final Time |
| --- | --- | --- | --- | --- |
| 1200 | 25¾ mins. | 370 mg. | 587 | 41½ mins. |
| 2000 | 24½ mins. | 380 mg. | 521 | 37½ mins. |

EXAMPLE 5

A rutile titanium dioxide pigment was coated with 1.0 percent by weight of hydrous alumina (calculated as $Al_2O_3$ and based on $TiO_2$), by treatment of an aqueous slurry of the pigment with aluminium sulphate followed by neutralisation with caustic soda. The aqueous slurry was then divided into four parts; a different quantity of a solution of a polycaprolactone was added to each of three of these parts, the molecular weight of the polycaprolactone being 1200. In order to provide a basis for comparison, no further surface-treatment was carried out on the fourth part. Each of the four slurries was filtered, and the resulting filter cakes were dried and micro-pulverised. Each of the finished pigments so obtained was then made up into an acrylic paint medium and tested for hiding power and gloss as described in British Pat. Specification No. 1,104,939. The results of the examinations are set out in the table below, which also shows the quantity of the polycaprolactone incorporated with each pigment.

| % by weight of polycaprolactone | Hiding Power (Square Feet per imperial gallon) | Gloss (45°) |
|---|---|---|
| - | 428 | 34 |
| 0.5% | 465 | 78 |
| 0.75% | 465 | 76 |
| 1.0% | 450 | 69 |

EXAMPLE 6

A quantity of rolled pigmentary titanium dioxide that had been obtained by the sulphate process, and of which 98.5 percent was in the rutile form, was leached with demineralised water for 30 minutes at 70° C. The leached material was then filtered and washed to reduce its water-soluble content to a low level. An aqueous slurry of the washed pigment having a concentration of 400 gms. $TiO_2$/litre was then prepared by dispersing the pigment in water at pH 10.2 in the presence of 0.25 percent by weight of sodium tetrapyrophosphate as dispersing agent. The slurry was divided into three parts which were treated as follows:

The first part was heated to 70° C. and 28 percent by weight (based on the weight of the pigment) of a polycaprolactone having a molecular weight of about 8000 was added slowly to the hot slurry. After the addition of the polycaprolactone, the slurry was agitated vigorously for 30 minutes, after which time the pH of the slurry was adjusted to 7 by means of 6N sulphuric acid. After a further 30 minutes of vigorous agitation, the pH of the slurry was again adjusted to 7 by the addition of acid. The pigment was then filtered, dried for 16 hours at 120° C., and dry milled.

The remaining two parts of the slurry were treated in the same way as the first part, except that the quantities of the polycaprolactone used were 38 percent and 49 percent, respectively.

The dispersibility of each pigment in polystyrene was tested as follows:

A quantity of the milled pigment that contained 5 parts by weight of $TiO_2$ was tumbled with 100 parts by weight of polystyrene. The resulting mixture was then screw injection-moulded, granulated, and the granules were then screw injection-moulded to yield a test panel. The test panel was pressed out on a hot roll mill to yield a pigmented film, which was examined visually to enable the dispersibility of the pigment to be evaluated.

The dispersibility of each pigment in polyethylene was investigated by preparing a test panel and test film in the same manner as described above for polystyrene.

In order to provide a basis for comparison with Example 6, a further quantity of the aqueous pigment slurry was contacted with 0.6 percent by weight of polydimethyl siloxane (based on the weight of the pigment), instead of being treated with the polylactone. The dispersibility of the resulting pigment in polystyrene was investigated as described in Example 6.

The results of the various examinations are set out in the Table below. In the case of polyethylene, both the test panels and the films were examined, but in the case of polystyrene only the test films were examined.

| Treatment | Appearance of test panels and films | | |
|---|---|---|---|
| | Polystyrene film | Polyethylene panel | Polyethylene film |
| 28% P.C.L. | Clear | Clear | Clear |
| 38% P.C.L. | Clear | Clear | Clear |
| 49% P.C.L. | Clear | Clear | Clear |
| 0.6% P.D.M.S. | Wispy streaks | Some streaks and pronounced aggregates | Very rough film containing many aggregates |

P.C.L. represents polycaprolactone
P.D.M.S. represents polydimethylsiloxane.

Referring to the above Table, a film or panel is described as clear when it is of a uniform colour and is free from streaks and pigment aggregates. The presence of streaks and/or aggregates indicates relatively poor dispersibility of the pigment.

We claim:

1. A process for the surface treatment of a titanium dioxide pigment, which comprises incorporating with the pigment from 0.1 to 60 percent by weight, based on the weight of the pigment, of a polylactone that has terminal hydroxyl groups and is in a liquid state.

2. A process according to claim 1, wherein the quantity of the polylactone is not greater than 25.0 percent by weight, based on the weight of the pigment.

3. A process according to claim 1, wherein the polylactone comprises a polylactone of the general formula I,

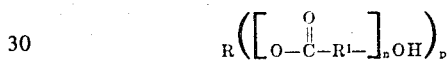

in which formula

R represents an aliphatic hydrocarbon group selected from the group consisting of saturated, unsaturated, substituted, and unsubstituted groups, and groups which are substituted in the carbon chain by at least one hetero atom;

R' represents an aliphatic hydrocarbon group having a straight chain of from 4 to 12 carbon atoms and selected from the group consisting of unsubstituted groups and groups substituted with at least one lower alkyl group;

n represents a whole number of from 2 to 300; and p represents a whole number of from 2 to 8.

4. A process according to claim 3, wherein any hetero atom in the carbon chain of the group R is an oxygen atom.

5. A process according to claim 3, wherein any lower alkyl substituent in the group R' is a methyl group.

6. A process according to claim 3, wherein the group R is derived from a polyol selected from the group consisting of ethylene-, propylene-, and hexylene-glycols; trimethylol propane, glycerol, pentaerythritol, mannitol, and sorbitol.

7. A process according to claim 1, wherein the polylactone is one derived from a lactone selected from the group consisting of valerolactone, caprolactone, 3,3,5-trimethylcaprolactone, heptanolactone, and dodecanolactone.

8. A process according to claim 1, wherein the polylactone is one derived from ethylene glycol and caprolactone.

9. A process according to claim 1, wherein the pigment is in the form of an aqueous slurry prior to the incorporation of the polylactone therewith.

10. A process according to claim 9, wherein a solid polylactone is rendered liquid by heating and is then incorporated in liquid form with the aqueous slurry.

11. A process according to claim 9, wherein a solid polylactone is incorporated with the slurry, the temperature of the slurry being such that the polylactone melts on contact therewith.

12. A process according to claim 1, wherein an aqueous emulsion of a liquid polylactone is incorporated with the pigment.

13. A process according to claim 1, wherein a polylactone solution is incorporated with the pigment while the latter is in a dry condition, and the solvent is then evaporated.

14. A process according to claim 1, wherein a solid polylactone is mixed with the pigment, and the temperature is then raised to render the polylactone liquid and thereby effect the said incorporation.

15. A new article of manufacture which comprises a titanium dioxide pigment with which has been incorporated from 0.1 to 60 percent by weight, based on the weight of the pigment, of a polylactone having terminal hydroxyl groups.

* * * * *